Figures 1, 2, 3, 4:
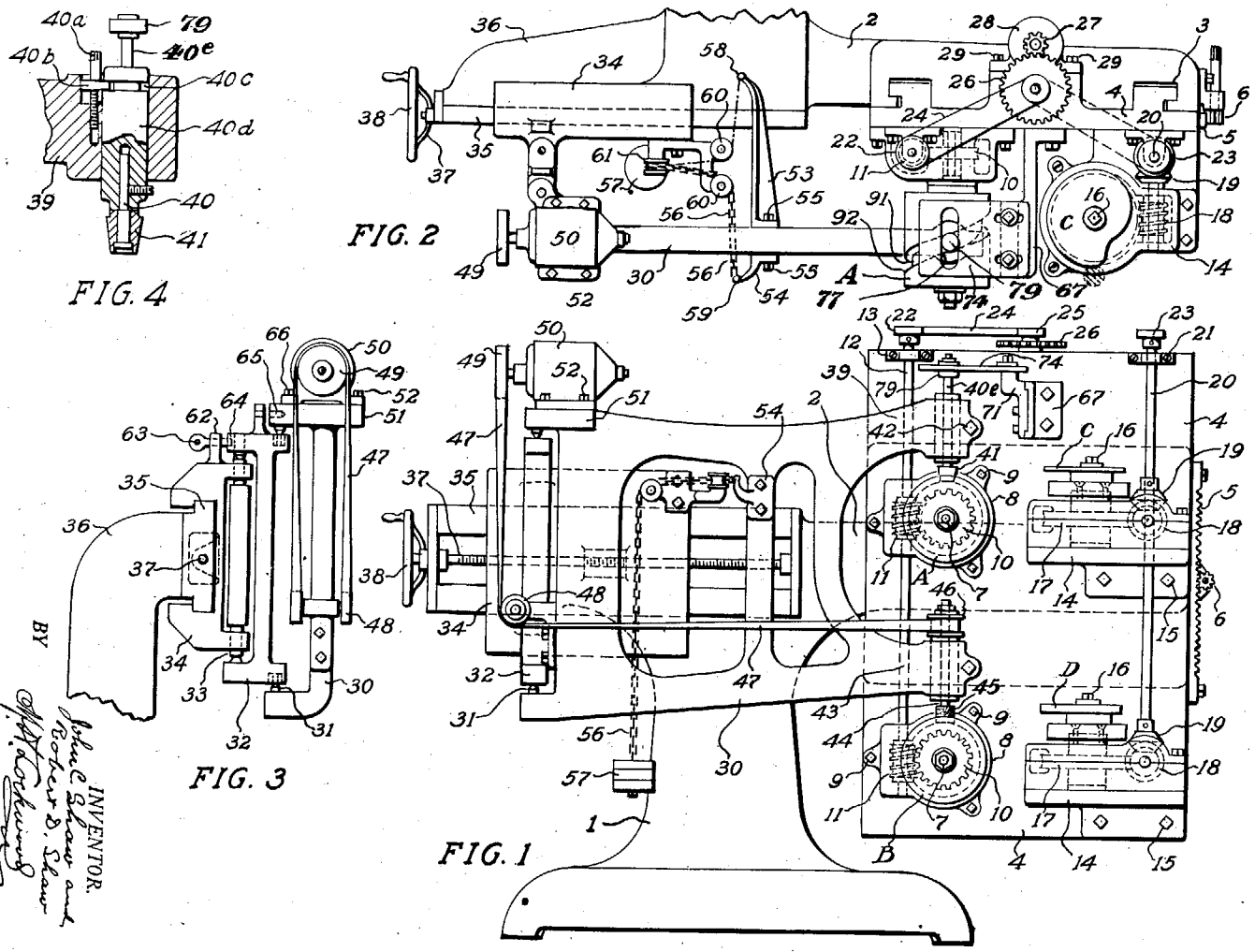

Feb. 14, 1933.

J. C. SHAW ET AL

CAM GRINDING MACHINE

Re. 18,733

Original Filed July 2, 1926 2 Sheets-Sheet 1

INVENTOR.
John C. Shaw and
Robert D. Shaw
BY
M. A. Lockwood
ATTORNEYS.

Feb. 14, 1933.

J. C. SHAW ET AL

CAM GRINDING MACHINE

Original Filed July 2, 1926 2 Sheets-Sheet 2

Re. 18,733

INVENTOR.
John C. Shaw and
Robert D. Shaw.

BY M. A. Lockwood
ATTORNEYS.

Reissued Feb. 14, 1933 Re. 18,733

UNITED STATES PATENT OFFICE

JOHN C. SHAW AND ROBERT D. SHAW, OF HARTFORD, CONNECTICUT, ASSIGNORS, BY MESNE ASSIGNMENTS, TO PRATT & WHITNEY COMPANY, A CORPORATION OF NEW JERSEY

CAM GRINDING MACHINE

Original No. 1,796,125, dated March 10, 1931, Serial No. 120,014, filed July 2, 1926. Application for reissue filed June 30, 1932. Serial No. 620,212.

This improvement relates more particularly to a cam grinding machine, adapted for grinding cams in accordance with a master cam, the arrangement being such that various forms of cams may be accurately ground. It is well understood that cams of various kinds are usually used without hardening in order to maintain the original accuracy of the cam as cut, for hardening will almost invariably produce a certain amount of distortion. Heretofore machines capable of properly and accurately grinding hardened cams have not been available and hence, various types of cams used in machines subject to great wear are required to be replaced frequently.

The object, therefore, of our improvement is to provide a cam grinding machine, which will accurately and rapidly grind any ordinary type of cam, such as cylinder or barrel cams, box cams, edge cams and face cams. It will also be understood that our cam grinding machine is adapted for grinding an indefinite number of duplicate cams, in that the cams to be ground are ground under the control of a master cam.

A further object of our improvement is to provide means for grinding cylindrical or drum cams for any particular arrangement or movement of the cam roller. For instance, in some types of machines, the cam roller for cooperation with the groove of the drum cam is mounted on a short radius arm, pivoted on an axis at right angles to the axis of the drum, and hence swings in the arc of a small circle in following the cam groove. Therefore, if provision is not made in the cutting and grinding of the cam groove for this circular arm movement, the cam roller will not enter the cam track at certain points. Furthermore, it has been customary in drum cams operating on a short radius arm, as just stated, to use a spherical roller or undercut the cam groove to such an extent as to provide only a point contact between the roller and cam groove, but with our improvement the groove can be so ground that a cylindrical follower roller can be used, thereby giving a line contact on the wall of the cam groove equal to the full width of the roller.

A further object is to provide means for adjusting the relative positions of the coacting members. For this purpose the cam rotating supports are preferably mounted on a work table which is provided with the usual means for adjusting its position, thereby providing for relative adjustment between the cam and the cam grinding element. Furthermore, to provide for grinding different types of cams, such as barrel and edge cams, two different arrangements of the cam rotating elements are provided, both being mounted on the work table. To take advantage of this double arrangement, the grinding element and master cam follower are mounted for transverse adjustment relative to the work table so as to bring them into cooperative relation with one or the other of the pairs of cam rotating members.

Furthermore, in some types of barrel and face cams, it is desirable to grind both side walls of the cam track or groove and therefore a further object is to provide means for resiliently urging the cam grinding element either toward or from the work table, to thereby provide for grinding the cam groove on both edges or sides.

Figure 7:
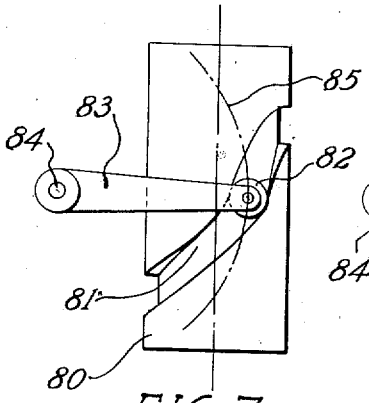
Figure 8:
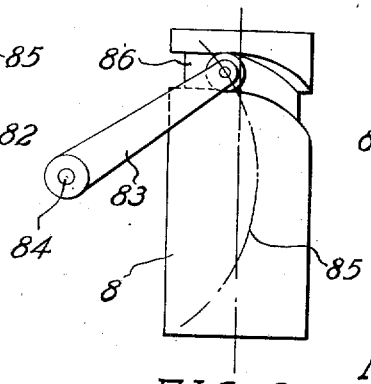
Figure 9:
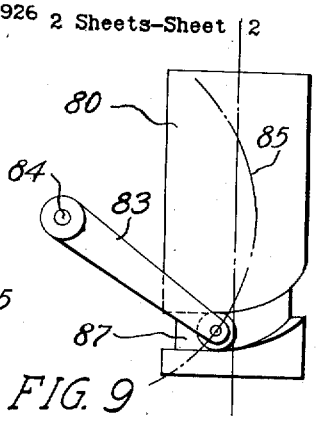
Figure 6:
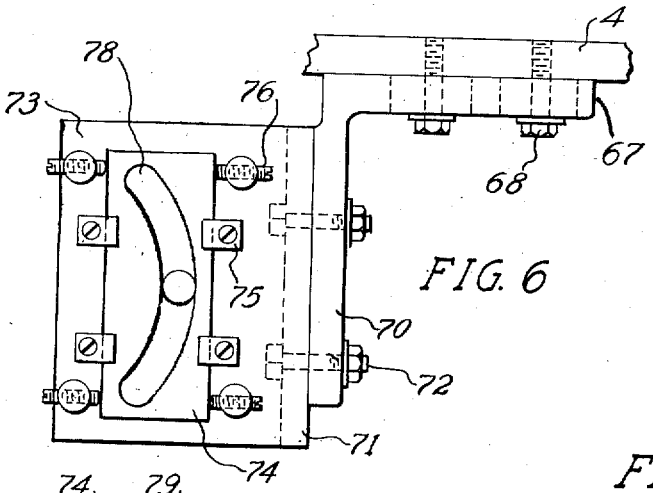
Figure 10:
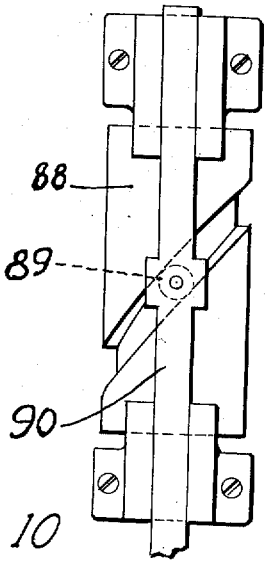
Figure 5:
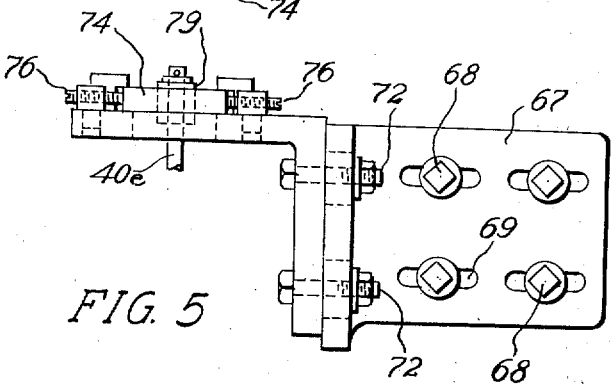
Figure 11:
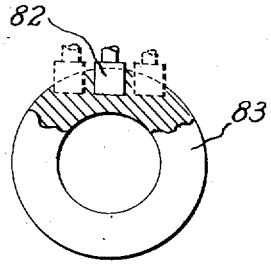

One form of our improved cam grinding machine is illustrated in the accompanying drawings, in which Fig. 1 shows the cam grinding machine in side elevation; Fig. 2 is a top plan view, the frame being partially broken; Fig. 3 is an end view of the pivotal support for the swinging arm, the frame being broken away; Fig. 4 is a sectional detail of the tracer or roller for the master cam; Fig. 5 is an enlarged side view of the guide bracket mounted on the work table; Fig. 6 is a top plan view of the bracket shown in Fig. 5; Figs. 7, 8 and 9 are plan views of a barrel cam in different positions for illustrating the swing of the radius arm carrying the cam roller; Fig. 10 illustrates another form of cam roller support and Fig. 11 is an illustrative sectional view.

Referring to the drawings, it will be seen that the cam grinding machine elements are preferably supported on a base member 1, provided with a laterally extending bracket arm 2, which is fitted with vertically disposed track ways 3, upon which the work table 4 is adapted to slide, substantially as illustrated in Fig. 1, showing the present form of the machine. Any usual or preferred means may be employed for vertical adjustment of the work table 4 and for this purpose, in the present instance, a rack 5 is secured to the edge of the work table 4, in position to cooperate with a pinion 6, which is adapted to be rotated for adjusting the work table up or down, as may be desired. The usual clamping means (not shown) for holding the work table in adjusted position may be employed.

The elements including arbors and gearing for supporting and rotating the master cam and the cam to be ground are mounted on the face of the work table 4, as illustrated in Figs. 1 and 2. For grinding barrel cams, the respective arbors for the master cam and cam to be ground extend at right angles to the face of the work table, while for grinding face or edge cams, the arbors extend parallel to the face of the work table. In the present machine the arbors 7 for barrel cams, which are adapted to be rotated on axes at right angles to the face of the work table, are mounted in substantially identical brackets or supports 8, which are secured to the face of the work table by suitable bolts 9, as will be seen in Figs. 1 and 2. Each bracket or support 8 is provided with a worm gear 10, cooperating with a worm 11 mounted on a vertically disposed shaft 12, rotating in suitable bearings in the respective brackets 8 and a bearing bracket 13, secured to the face of the work table 4. The barrel cam arbors 7, carried by the respective worm gears 10 are, therefore, adapted for simultaneous rotation and if, as in the present instance, the worms and worm gears for both arbors are of the same pitch, the master cam, which is mounted on the upper arbor, is adapted for synchronous movement with the cam to be ground, which is mounted upon the lower arbor 7, as illustrated in Fig. 1.

A somewhat similar arrangement is provided for grinding face and edge cams, but for supporting the arbors parallel to the work table, shelf-like bracket supports 14 are preferably secured at the right side of the work table 4 (Fig. 1) by suitable bolts 15, so that the respective arbors 16 thereof are vertically disposed and parallel to the face of the work table. The shelf bracket supports 14 are provided with worm gears 17 for rotating the respective arbors 16, said worm gears being rotated by worms 18. The latter are geared by miter gears 19 with a vertically disposed shaft 20, corresponding to and in parallel relation with the shaft 12 for rotating the barrel cam arbors 7. The shaft 20 is rotatably supported in bearings 21 secured to the face of the work table 4, the arrangement being such that, when the shaft 20 is rotated, the arbors 16 will be rotated in unison. Likewise as for the arbors 7, by having the miter gears 19, worms 18 and worm wheels 17 for both arbors 16 of the same relative pitch, the latter will be rotated simultaneously and the master cam and cam to be ground carried thereby will be rotated in synchronism, so that absolute accuracy as to reproduction is effected.

In order to rotate the respective pairs of arbors 7 and 16, the corresponding shafts 12 and 20 are provided with pulleys 22 and 23, secured to the upper ends thereof and adapted to be connected by means of a belt 24 with a pulley 25 mounted upon and rotated by a gear 26. The large gear 26 is in mesh with a pinion 27 mounted upon the shaft of a motor 28, preferably secured to a boss projecting from the rear upper edge of the work table 4, by bolts 29, as will be seen in Fig. 2 of the drawings. It will be understood that during operation of the machine only one shaft and set of arbors will be in operation at a time and the belt 24 is accordingly placed on either pulley 22 or 23 according to whether it is desired to grind barrel cams or edge cams.

For movably supporting the grinding element or abrasive wheel and the master follower roller, a swinging arm 30 is provided, the arm being fulcrumed, at the left as shown in Fig. 1, on cone pivots 31, which are supported on a floating member 32, the latter, in turn, being pivoted at 33 to a carriage or slide block 34, as will be seen in Fig. 3. The carriage or slide 34 is mounted on ways 35 extending laterally from a horizontal bracket arm 36, supported upon or forming part of the main frame 1, as shown in Fig. 2. The usual lead screw 37 and hand wheel 38 are provided for moving the slide 34 along the ways 35, transversely of the work table 4. By this construction, it will be seen that the swinging arm 30 may be located so that its free end will lie in cooperative relation with either the barrel cam arbors 7 or the edge cam arbors 16, according to which type of cam is to be ground.

The free end (at the right as shown in Fig. 1) of the swinging arm 30, is forked and the upper branch 39 is provided with a vertically adjustable spindle or shaft 40, carrying at its lower end a tracer roller 41, adapted to engage the cam track or groove in the master barrel or cylinder cam A carried on the upper arbor 7, as shown in Fig. 1. The tracer roller 41 is preferably tapered or cone shaped as shown in Fig. 4, so that by adjusting it up or down the depth of grinding contact of the grinding wheel can be regulated as desired. The vertical position of the roller 41 may be adjusted in any suitable manner and the spindle clamped in proper position by the bolt 42. The vertical adjustment of the tracer roller 41, in the present instance, is accomplished by means of a screw 40*a* (Fig. 4) provided with a flange 40*b* cooperating with a groove 40*c* in the bearing block 40*d*. Thus by turning the screw 40*a* the relative vertical position of the roller 41 can be regulated. The lower branch 43 of the swinging arm 30 carries a rotatable spindle 44, the lower end of which carries an abrasive wheel 45 constituting the grinding element for grinding the cam edge or groove such as the cam track or groove in the barrel cam B to be ground, mounted upon the lower arbor 7, as shown in Fig. 1. The barrel cam B, being the cam to be ground in conformity with the master cam, should be mounted on its arbor so that the cam track thereof will coincide, in relative position circumferentially and otherwise with the cam track on the master cam A on the upper arbor 7. It will be understood also that, in the present instance, the spindles 40 and 44 carrying respectively the master follower or tracer roller and the grinding element are mounted in axial alignment in a plane passing through the fulcrum pivot 31 of the swinging arm 30. In other words, a line passing through the axes of the master roller 41 and the abrasive wheel 45 will be parallel to the pivotal axis of the swinging arm 30, and also parallel to the face of the work table 4.

The upper end of the grinding wheel spindle 44 is provided with a pulley 46 over which a belt 47 passes for rotating the grinding wheel 45 at the desired speed. The belt 47, as shown in Figs. 1 and 3, passes over direction changing idler pulleys 48 to a pulley 49 mounted on the shaft of the motor 50. The motor 50 is mounted on a shelf 51 on the rear upper edge of the bracket 30, being secured thereto by suitable bolts 52, as will be seen in Figs. 1 and 2.

Obviously, in grinding barrel and face cams, or other cams, having a slot or groove for operation upon a cam roller, it is desirable to provide for grinding both side walls or edges of the cam grooves. Therefore, the master roller and abrasive wheel should be resiliently movable so as to follow the edge to be ground. To provide for thus urging and moving the swinging arm 30, either toward or from the face of the work table 4, brackets 53 and 54 are secured by bolts 55 to the swinging arm 30, as will be seen in Figs. 1 and 2. A chain or cable 56 carrying a weight 57 is adapted to be connected to the end 58 or 59 of the respective brackets 53, 54 to resiliently move the swinging arm 30, either toward or from the face of the work table 4. As will be seen in Fig. 2, intermediate guide pulleys 60 and 61 are provided for changing the directions of pull of the chain or cable 56, from vertical to horizontal.

It will be understood that ordinary barrel or cylinder cams, such as may be ground on our improved machine, are preferably designed for use with a cylindrical follower roller and, hence, are cut for and intended to cooperate with such follower rollers. Furthermore, these cylindrical follower rollers are frequently mounted upon radius arms which are usually shorter or of a different length than the radius of the swinging arm 30, that is, the length between the pivot axis 31 and the axes of the master roller 41 and grinding wheel 45. For this reason, some provision should be made for grinding the cam to conform both to the motion of the follower roller on the radius arm and to the changing angularity of the center line in reference to the radius of cam, as indicated in Fig. 11, otherwise the roller will not enter the groove at certain positions of the follower arm. Therefore, in our improvement, provision is made for compelling the grinding element to follow any predetermined path, corresponding to the path required to be followed by the cam roller during the operation of the cam. For this purpose, the swinging arm 30, as previously pointed out, is pivotally mounted on and supported by the bracket 32, which, as will be seen in Fig. 3, is pivoted at 33 to the slide 34.

It may be desirable to use the machine with the swinging arm 30 movable on a single pivot, and for this purpose the slide 34, in the present instance, is provided with an upwardly projecting lug 62, having an eye through which a locking bolt 63 may be passed into a socket at 64, in the floating bracket 32, to thereby lock it in predetermined position, preferably at right angles to the face of the slide 34, as seen in Fig. 3, thus pivoting the arm 30 on the pivots 31 only. A similar lug 65 is provided on the upper end of the floating bracket 32, through which the locking bolt 63 may be passed into a socket at 66 for locking the swinging arm 30 to the floating bracket 32 so that it swings from the pivots 33, thereby providing for changing the pivotal relation of the fulcrum of the arm to the tracer roller and grinding element. Obviously, for swinging movement of the arm on a single pivot, the locking bolt 63 should be placed only in one or the other of the sockets 64, 66, according to the pivotal action required.

When, however, the fulcrum of the swinging arm 30 is to remain freely floating, it will be necessary, as previously indicated, to guide the free or outer end of the arm, as it is moved toward or from the work table 4 under the guidance of the master cam A, which will move the swinging arm by means of the master follower roller 41. For this purpose, an angle bracket 67 (see Figs. 5 and 6) is mounted on the work table 4 by bolts 68 which preferably pass through elongated holes 69, so as to provide for lateral adjustment of the bracket. The outwardly extending angle portion 70 of the bracket is faced off and carries another angle bracket 71 secured thereto by bolts 72 which likewise pass through elongated holes to provide for positioning the bracket 71. The upper horizontal face 73 of the bracket 71 is adapted to support a plate 74 which may be adjustably secured thereto by clamps 75 and adjusting bolts 76, as indicated in Figs. 5 and 6. The plate 74, when mounted on the bracket, is provided with a closed slot 77 which may be straight, as shown in Fig. 2, or arc shaped on any desired radius, as indicated at 78 in Fig. 6. As will be seen in Figs. 1 and 2, the slot 77 in the plate 74 is adapted to cooperate with a roller 79 carried on the upper end of the spindle 40*e*, the arrangement being such that the slot 77 and roller 79, in cooperation with the tracer roller 41 following the master cam groove will guide the movement of the free end of the swinging arm 30, to conform to the desired path of the follower. In this manner, it will be seen that if the cam groove has been rough-cut to the proper shape of a cam to be ground to conform to the requirements of a cylindrical follower roller on a given radius, in the machine, for which the cam is designed; then, with the master roller 41 following the master cam, and the guide roller 79 following a curved slot 78 of the desired radius, as shown in Fig. 6, in the plate 74, the cam to be ground will be accurately ground to the desired shape and dimensions such as to properly fit and operate in conjunction with a cylindrical follower roller (see Fig. 11).

To illustrate the desirability of this floating mounting of the swinging arm 30, and the action of the plate 74, Figs. 7, 8 and 9 of the drawings are inserted to illustrate a barrel cam 80, provided with a track or groove 81 with which the follower roller 82 cooperates. It will be seen, however, that in this particular arrangement, the roller 82 is mounted on a relatively short follower arm 83 pivoted at 84, thereby compelling the roller 82, as it follows the cam groove, to swing through the arc of the circle, represented by dotted lines at 85, in passing from one end 86 of the cam to the other end 87 thereof. Obviously, if the edges or side walls of the cam groove 81—86—87 were ground with the swinging arm 30 of the cam grinder on a fixed pivot, the cam follower roller 82 would not enter the cam groove at certain positions, because the radius of the arm 30 is much longer than the radius arm 83 for the follower roller 82. Furthermore, it will be obvious from Fig. 11 that, with a cylindrical follower roller 82, the track or groove in the barrel cam must be cut and ground with its side walls at varying angles to the radius of cam barrel for the axis of the follower roller 82 comes into line with the radius only at one point during the swing of the follower arm 83 in either direction from the center, this point being represented by the central full line position of the roller 82 in Fig. 11. Therefore, with our improved grinding machine, it will be seen that, by mounting the plate 74 on the bracket 71, with a curved arc slot 78 corresponding to the curvature of the arc 85, representing the path of the follower roller 82 the roller path or groove in the cam 80 will be ground in absolute conformity to the requirements of the follower roller 82, as it swings on the follower arm 83, as represented in Figs. 7 to 9 and 11.

On the other hand, if the barrel cam 88, as shown in Fig. 10, is intended to operate a cam roller 89 slidably movable in a straight line, parallel to the axis of rotation of the cam, as, for instance, when guided by a reciprocating sliding bar 90, the tracking of the roller 89 would be imperfect if ground with the swinging arm, unless provision is made for a corresponding, parallel to the axis, movement of the grinding element. Hence, by providing the plate 74 with a straight slot 77, as shown in Fig. 2, the latter, by cooperating with the roller 79, will so guide the grinding wheel 45, as the master roller 41 follows the master cam, that the cam to be ground (B) will conform accurately to the type of the cam represented in Fig. 10.

The operation of our improved cam grinding machine can be readily understood from the description given in connection with the drawings and it will be seen that when it is desired to grind a cylinder or barrel cam, the slide 34 is moved, by means of the hand wheel 38, to the position shown in Figs. 1 and 2, so that the axial line of the master roller 41 passes through the axis of the upper arbor 7, to which the master cam A is secured, and the same axial line, which also passes through the grinding wheel 45, passes through the axis of the lower arbor 7, upon which B, the cam to be ground, is mounted. The master cam and the cam to be ground should be mounted in the same relative position circumferentially, so that when the shaft 12 is rotated, the cam to be ground will be rotated in synchronism with the master cam, the cams being rotated by the respective worms 11 and worm gears 10.

As previously pointed out, it will be understood that if the barrel cam B, to be ground, is intended for use with a cam roller, supported for use upon a radius arm, as illustrated in Figs. 7 to 9, the plate 74 is brought into use and provided with the desired arcuate slot 78; the plate 74 being mounted upon the bracket 71 for cooperation with the guide roller 79.

As previously pointed out, the walls or edges of the cam groove are ground separately. In the operation of grinding the inner wall or edge of the cam to be ground, as shown in Fig. 2, the swinging arm 30 should be urged toward the work table 4 and, for this purpose, the chain 56 is secured to the hook end 59 of the bracket 54, so that the weight 57 will tend to pull the arm 30 inward, so that the master roller 41 will follow the edge 91. When it is desired to grind the outer wall or edge of the cam, the chain 56 is secured to the hook end 58 of the bracket 53, thereby urging the swinging arm 30 outward or away from the work table 4, so that the master roller will follow the edge 92.

It will be understood that the motor 28, through the belt 24, will rotate the shaft 12 and thereby rotate the master cam and cam to be ground in synchronism, while the motor 50, through the belt 47, will rotate the grinding element or abrasive wheel 45 for grinding the walls or edges of the cam B in conformity with the master cam under the guidance of the master roller 41. It will also be understood that after the roller 41 and abrasive wheel 45 have been properly adjusted as to their relative position on the axial line thereof, their relation to the face or wall of the master cam and cam to be ground can be adjusted by moving the work table 4 vertically, either up or down, by means of the rack and pinion 5—6. Such adjustment can be made at the start of the grinding operation to place the grinding wheel 45 properly in the groove of the barrel cam, but the position of the grinding face of the grinding wheel is determined by adjusting the taper tracer wheel 41 up or down by means of the screw 40*a*. This taper tracer roller has other advantages. For instance, it permits adjustments for varying the diameter of the grinding wheel thus permitting the grinding of cams with different widths of grooves from the same master cam. Also it permits taking a "roughing cut" and a "finishing cut".

When it is desired to grind face or edge cams, the slide 34 will be moved toward the right, as viewed in Figs. 1 and 2, by the hand wheel 38, until the axial line of the roller 41 and grinding wheel 45 is in the plane of the arbors 16, that is, in a plane at right angles to the work table 4. In this position the master roller 41 will be in position to cooperate with the master cam C mounted on the upper arbor 16, while the abrasive wheel 45 will be in position to grind the edge of the cam D, which is mounted upon the lower arbor 16, as indicated in Figs. 1 and 2. During this operation, the shaft 20 should be rotated so as to rotate the worms 18 and thereby rotate the arbors 16 in unison, and for this purpose, the belt 24 will be swung over to the dotted line position as shown in Fig. 2, so as to engage the pulley 23.

In grinding the groove or track in barrel or face cams it will be understood that it is preferable to grind the walls of the cam groove with a grinding wheel having substantially the diameter of the follower roller to be used therein, but the wheel should not be large enough to fill the groove and touch both walls.

While we have shown and described the preferred form of our improved cam grinding machine, it will be understood that we do not wish to be limited to the construction shown for various modifications in the specific details thereof may be made without departing from the spirit and scope of the invention.

We claim:

1. A cam grinding machine comprising a work table, a pair of rotatable elements on said table for grinding barrel cams, one of said elements supporting a master cam and the other the cam to be ground, a second pair of rotatable elements mounted on said table for grinding edge cams, one of the last named elements supporting a master cam and the other the cam to be ground, a swinging arm pivotally mounted and carrying a tracer roller and an abrasive wheel for cooperation respectively with the master cam and cam to be ground of one pair or of the other of said rotatable elements, a slide member upon which said swinging arm is pivotally mounted and means for moving said slide member to bring the master roller and abrasive wheel into position to cooperate with the cams of one or the other of said pairs of elements.

2. A cam grinding machine as claimed in claim 1, in which said swinging arm is mounted on a floating pivot member pivotally supported on said slide and a cooperating slot and roller are provided for guiding the free end of said swinging arm, when in position for grinding barrel cams.

3. A cam grinding machine as claimed in claim 1, in which said work table is provided with feed means adapted for adjusting the position thereof and hence of the respective pairs of cam elements axially of and relative to the master roller and abrasive wheel carried by said swinging arm, so as to vary the position of the face of the grinding wheel relative to and transversely of the face of the cam being ground.

4. The cam grinding machine as claimed in claim 1, in which means is provided for resiliently urging said swinging arm toward said work table for grinding one face of a cam and away from said table for grinding the other face of said cam.

5. The cam grinding machine as claimed in claim 1, in which a motor mounted on said work table is provided for rotating one or the other of said pairs of rotatable elements, substantially as described.

6. A cam grinding machine comprising a support for a master cam, a support for the cam to be ground, means for rotating said cam supports in unison, a movable member carrying a tracer roller and an abrasive wheel for cooperation respectively with the master cam and the face of the cam to be ground and means controlling movement of said movable member transversely of the axes of said rotating supports while said tracer roller follows the master cam, including a floating pivot for said movable member and a guide slot and roller for guiding said movable member transversely of said rotatable cam support.

7. A cam grinding machine comprising a rotatable support for a master cam, a rotatable support for the cam to be ground, means for rotating said cam supports in synchronism, movable means supporting a tracer roller and a rotating grinding wheel for cooperation respectively with said master cam and the cam to be ground, said tracer roller and the grinding wheel being located in axial alignment in a plane at right angles to the direction of motion of said movable means, a cone-shaped tracer roller mounted on said movable supporting means and means for adjusting the position of the latter in an axial direction to adjust the position of the grinding wheel toward and from the face of the cam to be ground.

8. A cam grinding machine comprising a rotatable support for a master cam, a rotatable support for the cam to be ground, means for rotating said cam supports in synchronism, movable means supporting a tracer roller and a rotating grinding wheel for cooperation respectively with said master cam and the cam to be ground, said tracer roller and the grinding wheel having their axes normal to the direction of motion of said movable means and means to axially adjust the tracer roller toward and from the cylindrical surface of the master cam independently of the adjustment of the grinding wheel toward and from a cam surface to be ground.

9. A cam grinding machine comprising a rotatable support for a master cam, a rotatable support for the cam to be ground, means for rotating said cam supports in synchronism, movable means supporting a tracer roller and a rotating grinding wheel for cooperation respectively with said master cam and the cam to be ground, said tracer roller and the grinding wheel being located in axial alignment in a plane at right angles to the direction of motion of said movable means, a tracer roller mounted on said movable supporting means and means for adjusting the position of the latter in an axial direction to adjust the position of the grinding wheel toward and from the face of the cam to be ground.

10. A cam grinding machine comprising a support for a master cam, a support for the cam to be ground, means for rotating said cam supports in unison, a movable member carrying a tracer roller and an abrasive wheel for cooperation respectively with the master cam and the face of the cam to be ground and means controlling movement of said movable member transversely of the axis of said rotating supports while said tracer roller follows the master cam said means including a guide slot and roller for guiding said movable member transversely of said rotatable cam support.

11. A cam grinding machine comprising a support for a master cam, a support for the cam to be ground means for rotating said cam supports in unison, a movable member carrying a tracer roller and an abrasive wheel for cooperation respectively with the master cam and the face of the cam to be ground and means controlling movement of said movable member transversely of the axis of said rotating supports while said tracer roller follows the master cam, said means including a freely adjustable connection for said movable member permitting transverse movement of said tracer roller and grinding wheel relative to said cams and a fixed template engaged by a roller on said movable member for guiding said movable member transversely of said rotatable cam support.

12. A cam grinding machine comprising a support for a master cam, a support for the cam to be ground, means for rotating said cam supports in unison, a movable member carrying a tracer roller and an abrasive wheel for cooperation respectively with the master cam and the face of the cam to be ground, and means controlling movement of said movable member transversely of the axes of said rotating supports while said tracer roller follows the master cam, said means including a guide slot and roller for guiding said movable member transversely of said rotatable cam support and means to effect feeding movements of said wheel relative to the cam surface of the cam to be ground.

13. A cam grinding machine comprising a work table a pair of rotatable elements on said table for grinding barrel cams, one of said elements supporting a master cam and the other the cam to be ground an arm adjustably mounted relative to said elements and carrying a tracer roller and an abrasive wheel for cooperation respectively with the master cam and cam to be ground, and means to transversely move said tracer roller and abrasive wheel relative to said cams in accordance with an arcuate path during the grinding operation.

14. A cam grinding machine comprising a work table, a pair of elements on said table for grinding barrel cams, means to rotate said elements in unison, one of said elements supporting a master cam and the other the cam to be ground, an arm adjustably mounted relative to said elements and carrying a tracer roller and an abrasive wheel for cooperation respectively with the master cam and cam to be ground, means to adjust said tracer roller within the arm toward and from the surface of said master cam, and means to adjust the position of said table to simultaneously adjust said master cam and cam being ground toward and from the roller and wheel.

In testimony whereof, we hereto affix our signatures.

JOHN C. SHAW.
ROBERT D. SHAW.